United States Patent
Lee et al.

(10) Patent No.: US 7,155,664 B1
(45) Date of Patent: Dec. 26, 2006

(54) EXTRACTING COMMENT KEYWORDS FROM DISTINCT DESIGN FILES TO PRODUCE DOCUMENTATION

(75) Inventors: R. Samual Lee, Meridian, ID (US); Calvin K. McDonald, Boise, ID (US)

(73) Assignee: Cypress Semiconductor, Corp., San Jose, CA (US)

( * ) Notice: Subject to any disclaimer, the term of this patent is extended or adjusted under 35 U.S.C. 154(b) by 630 days.

(21) Appl. No.: 10/061,906

(22) Filed: Feb. 1, 2002

(51) Int. Cl.
*G06F 7/00* (2006.01)

(52) U.S. Cl. ............... 715/502; 715/500; 715/512; 717/123

(58) Field of Classification Search ........... 715/500, 715/512–513, 502; 717/123
See application file for complete search history.

(56) References Cited

U.S. PATENT DOCUMENTS

| | | | | |
|---|---|---|---|---|
| 5,263,162 A * | 11/1993 | Lundeby | ........... | 717/143 |
| 5,452,206 A * | 9/1995 | Turrietta et al. | ........... | 715/531 |
| 6,029,182 A * | 2/2000 | Nehab et al. | ........... | 715/523 |
| 6,199,067 B1 * | 3/2001 | Geller | ........... | 707/10 |
| 6,286,014 B1 * | 9/2001 | Fukushima et al. | ........... | 707/200 |
| 6,507,855 B1 * | 1/2003 | Stern | ........... | 715/513 |
| 6,684,381 B1 * | 1/2004 | Bening et al. | ........... | 716/18 |
| 6,687,878 B1 * | 2/2004 | Eintracht et al. | ........... | 715/512 |
| 6,981,207 B1 * | 12/2005 | Bakman et al. | ........... | 715/500 |
| 2002/0078090 A1 * | 6/2002 | Hwang et al. | ........... | 707/513 |
| 2002/0138476 A1 * | 9/2002 | Suwa et al. | ........... | 707/3 |
| 2004/0210833 A1 * | 10/2004 | Lerner et al. | ........... | 715/512 |

OTHER PUBLICATIONS

"How to Write Doc Comments for the Javadoc Tool", Java.com from Archive.org, 2001.*
Kramer, D., "How to Write Doc Comments for the Javadoc Tool", Java.com from Archive.org, 1999.*
CSC 148H Introduction to Computer Science, http://www.cs.toronto.edu, 1999.*
Foster, M., "How to Use JavaDoc to Document Your Programs", Aug. 2000, http://www.cs.toronto.edu, 1999.*
JavaDoc Home Page, Archive.org, 1999.*
The Java Language Specification Documentation Comments, Chapter 18, Archive.org, 1998.*
Goldstein et al, Multi-document summarization by sentence extraction, Apr. 2000, NAACL-ANLP 2000 Workshop on Automatic summarization—vol. 4, Association for Computational Linguistics, pp. 40-48.*
Lemay et al, "Laura Lemay's Workshop Creating Commercial Web Pages", Sams, 1996, pp. 4-9.*

* cited by examiner

*Primary Examiner*—Cesar Paula
(74) *Attorney, Agent, or Firm*—Marger Johnson & McCollom PC

(57) ABSTRACT

The invention relates to an automatic documentation tool and associated method. The method includes embedding comments into a plurality of source files defining the design, creating a configuration file including parameters associated with each source file, and extracting the comments from each source file responsive to the parameters. The method is capable of operating on a plurality of source files originating from a plurality of design tools. The method is capable of sorting through keywords preceding each comment and ordering the comments according to a user's request. The method is capable of receiving register definitions from a header file.

10 Claims, 6 Drawing Sheets

EXTRACTING COMMENT KEYWORDS FROM DISTINCT DESIGN FILES TO PRODUCE DOCUMENTATION

1. RELATED APPLICATION DATA

The present application claims priority from U.S. patent application Ser. No. 10/003,618, entitled AUTOMATIC DOCUMENTATION GENERATION TOOL AND ASSOCIATED METHOD, filed Nov. 14, 2001, which claims priority from U.S. provisional patent application Ser. No. 60/248,946, entitled APPLICATION SPECIFIC INTEGRATED CIRCUIT, filed Nov. 14, 2000, which is incorporated herein by reference.

BACKGROUND OF THE INVENTION

1. Field of the Invention

This invention relates to a documentation generation tool and, more particularly, to a documentation generation tool adapted to automatically extract comments from a variety of source files and specify the order in which those comments should appear in a produced output file. The invention also relates to a method of automatically generating documentation from a variety of source files.

2. Description of the Related Art

Engineers document the products they design by creating a variety of product documentation, each tailored to a specific readership. For any single product, product documentation might include the Internal Reference Specification (IRS), the External Reference Specification (ERS), the Hardware User's Guide (HUG), the Engineering Notes (EN), and the like. The IRS documents the product's operation for other company employees remaining largely confidential. The ERS similarly documents the product's operation excluding company confidential information. The ERS is widely distributed both inside and outside the company. The HUG details the product's hardware to the software. The EN often provides specific product implementation examples.

During the product's design, it is customary for engineers to include comments in the electronic files that describe their products. For example, firmware engineers include comments in a source code file describing the firmware's operation. The comments might include a definition of the variables used in a particular module as well as a description of how that module operates with other associated firmware modules. Similarly, electrical engineers include comments in the Hardware Description Language (HDL) source file describing a particular integrated circuit design. The comments might include a definition of the operation of a circuit block as well as a description of how that block relates to other circuit blocks.

Documentation tools are currently available that automatically extract these comments from their corresponding source files, for example, a firmware source code file or an HDL source file, and copy them onto a separate output file. A user then edits the output file to produce the desired product documentation be it an IRS, ERS, HUG, or EN. Examples of currently available documentation tools include Javadoc, Perlpod, LaTEX, and others.

Javadoc parses the declarations and documentation comments in a set of Java source files and produces a set of output pages describing details associated with the source code. Perlpod is a translator for the perl scripting language used to embed documentation within a no perl source code. LaTEX is a document preparation system for high-quality typesetting.

These documentation tools have a disadvantage in that they are highly dependent on the structure of the particular source file on which they operate. That is, these documentation tools do not operate on a variety of source files originating from a variety of design tools. For example, Javadoc operates exclusively on java source files extracting information from the java code itself as well as comments. Similarly, Perlpod operates exclusively on perl language source files. Moreover, these documentation tools do not have the ability to include web links, web pages, or other objects such as graphs and pictures in the generated output documentation.

Accordingly, a need remains for an automatic documentation generation tool that improves on the currently available tools.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT(S)

Figure 1A:
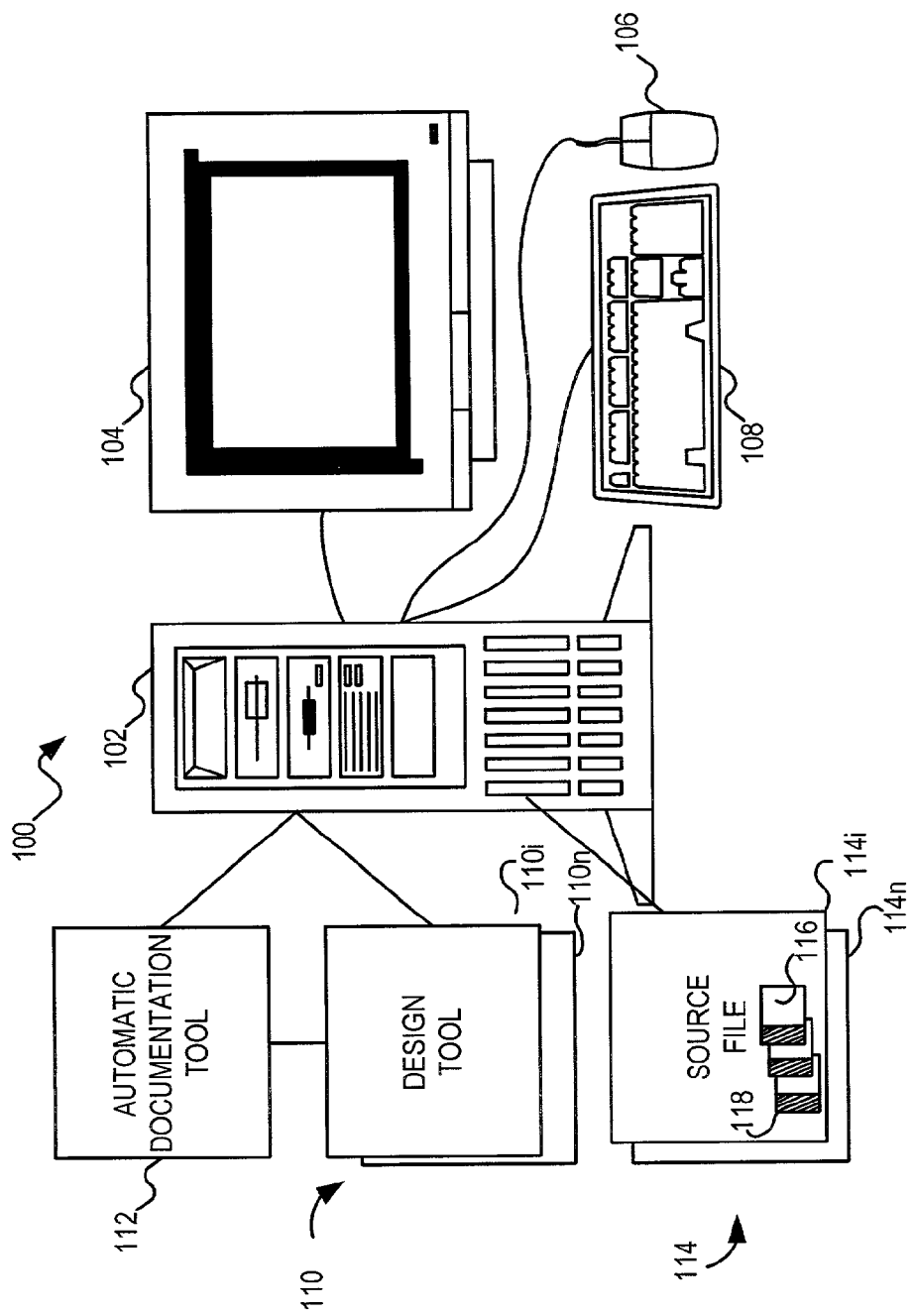
FIGS. 1A and 1B are system diagrams including an automatic documentation tool in accordance with the present invention.

Referring to FIG. 1A, a tool and method for automatically generating documentation 112 operates on a computer system 100. Computer system 100 conventionally includes a computer 102, a monitor 104, a keyboard 108, and a mouse 106. Computer system 100 includes internal components not shown in FIG. 1A, e.g., a central processing unit, memory, file system, and the like. Computer system 100 might further include optional equipment not shown in FIG. 1A, e.g., a printer and other input/output devices.

Computer system 100 includes design tools 110 and the documentation tool 112 according to a preferred embodiment of the present invention. Design tools 110, e.g., tools 110$i$ ... 110$n$, create a corresponding plurality of source files 114, e.g., source files 114$i$–114$n$, defining a product design. For example, design tool 110$i$ might be a Hardware Description Language (HDL) design tool that uses an HDL source file 114$i$ for an integrated circuit design such as an Application Specific Integrated Circuit (ASIC). Examples of HDL design tools are tools based on Very High Speed Integrated Circuit Hardware Description Language (VHDL). Another example of an HDL design tool is Verilog® from Cadence Design Systems. The documentation tool 112 is a software program that operates on the plurality of source files 114 regardless of the originating design tool 110.

Each source file 114 includes a plurality of comments 116, e.g., ASCII text comments, associated with particular portions of the corresponding source file 114. The comments 116 might be single line comments. Each comment 116, in turn, is preceded by a corresponding keyword 118 identifying the comment 116 to the documentation tool 112. The documentation tool 112 identifies each comment 116 by its preceding keyword 118, extracts the comments 116 from each of the plurality of source files 114, and generates the desired output files 210 (FIG. 2) therefrom.

Figure 1B:
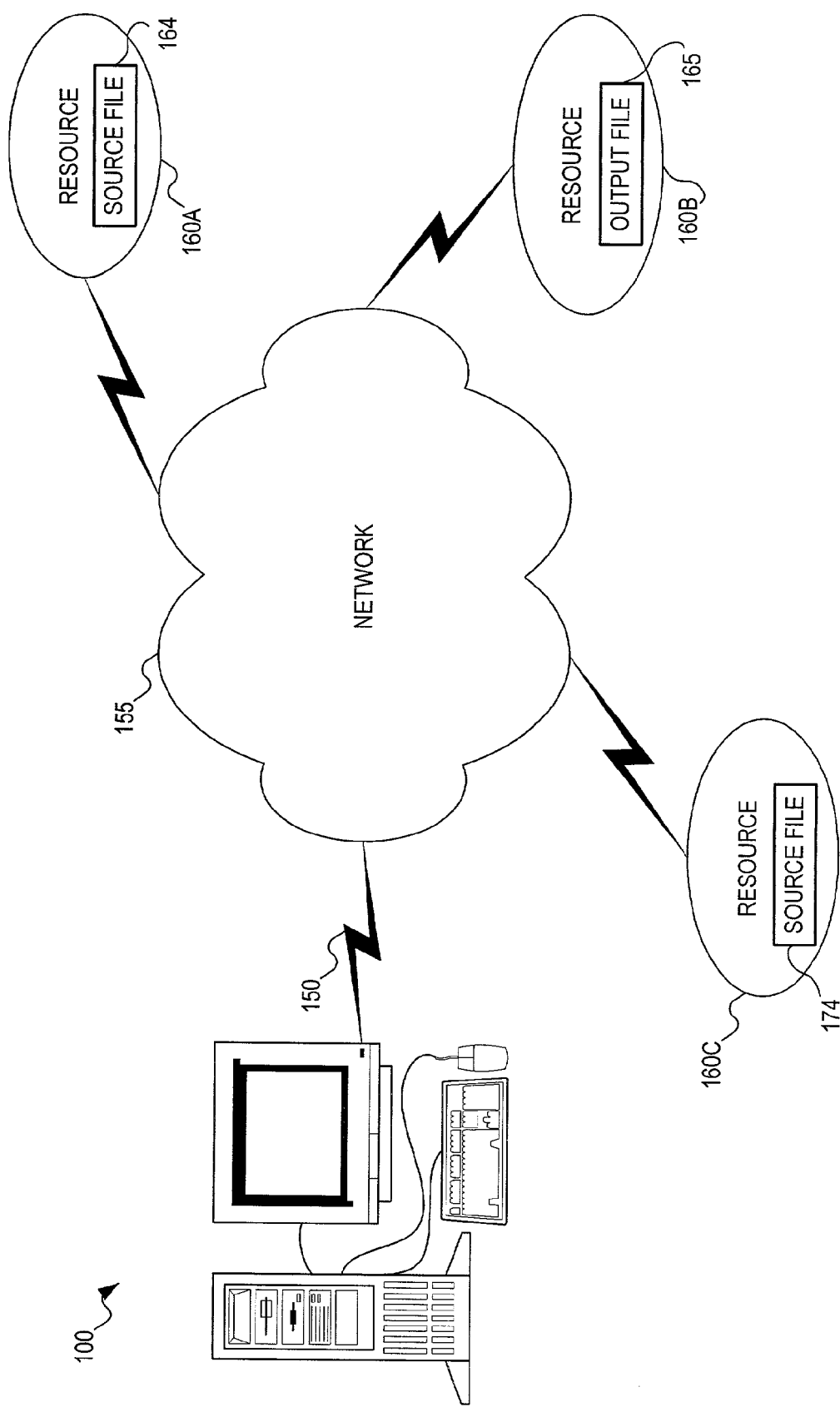

Referring to FIG. 1B, shows computer system 100 connected over a network connection 150 to a network 155. By using network 155, resources, e.g., computers and their associated software facilities, peripherals, and data files, such as resources 160A, 160B, and 160C, are accessible to the computer system 100. Computer system 100 containing documentation tool 112 is thus capable of operating on source files 164 and 174 stored in resources 160A and 160C, respectively. Computer system 100 containing documentation tool 112 is additionally capable of storing the resulting output file 165 associated with source files 164 and 174 in resource 160B.

Figure 2:
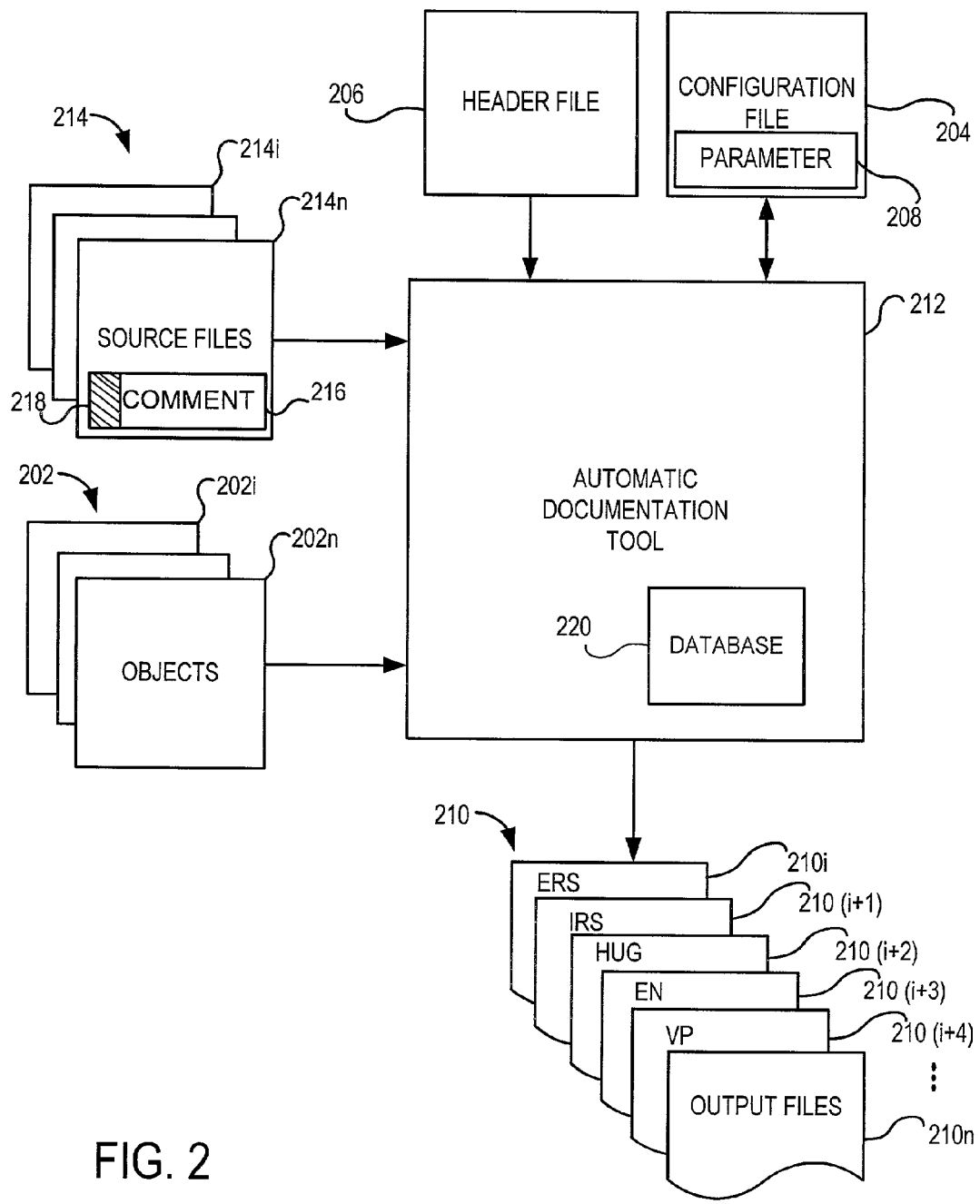
FIG. 2 is a block diagram of the automatic documentation tool shown in FIGS. 1A and 1B.

Referring to FIG. 2, automatic documentation tool 212 extracts comments 216 from the source files 214 responsive to a configuration file 204. More particularly, documentation tool 212 operates responsive to parameters 208 included in configuration file 204. Parameters 208 define attributes of the product design associated with each source file 214. Parameters 208 might include source file type and comment character definition, design name, directory structures for source file locations, output file locations, object locations, and the like, and revision number(s).

Figure 3:
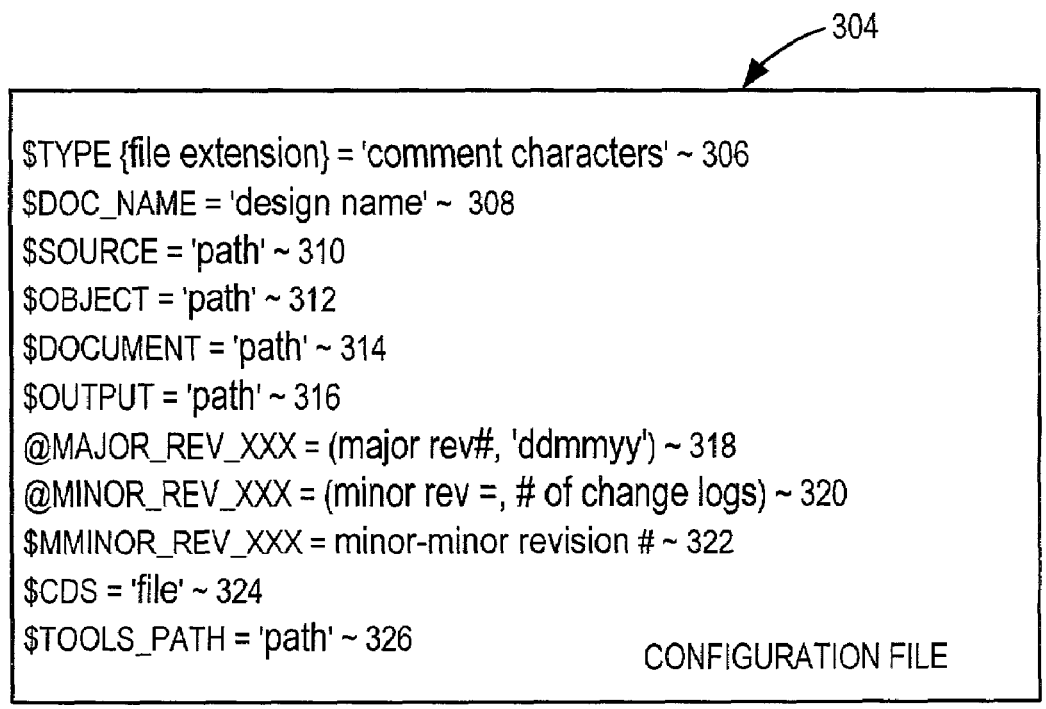
FIG. 3 is an exemplary diagram of the configuration file shown in FIG. 2.

Examples of parameters 208 are shown in FIG. 3. Source file type parameter 306 defines source file extensions and associated comment characters. For example, if the source file is a VHDL file with the extension .vhd and whose associated comment character is --, the source file type parameter 306 included in the configuration file 204 would be $FTYPE\{vhd\}=--$.

Design name parameter 308 defines the product's top-level design name. Source parameter 310 identifies to the documentation tool 212, the directory in which to find the source files 214. Object parameter 312 identifies to the documentation tool 212, the directory in which object files are located. Similarly, document parameter 314 identifies to the documentation tool 212, the directory in which all documents referenced by the source files 214 are located. Output parameter 316 indicates to the documentation tool 212, the directory in which to place generated output files 210, e.g., ERS output file 210i, IRS output file 210(i+1), HUG output file 210(i+2), EN output file 210(i+3), VP output file 210(i+4), and the like. The directory locations of objects and documents included in the generated output file 210 are preferably defined relative to the output directory specified by the output parameter 316.

Separate revision numbers are kept for each type of output file 210. Major revision parameter 318 includes characters identifying the output file type, e.g., the ERS output file 210i. Major revision parameter 318 indicates a major milestone in the output file and is typically set manually by a user before running the documentation tool 212. Minor revision parameter 320 keeps track of the number of change logs, that is, when any change has been made to any source file 214. Minor—minor revision parameter 322 indicates the number of times documentation tool 212 generates each output file 210. Documentation tool 212 typically automatically increments the minor and minor—minor revision parameters 320 and 322, respectively.

Documentation tool 212 includes the major, minor, and minor—minor revision parameters 318, 320, and 322, respectively, on a revision history page (not shown separately) attached to each output file 210. Documentation tool will typically only show the major and minor revision parameters on a cover page (not shown separately) attached to each output file 210.

Notably, an additional parameter is a header parameter 324 indicative of a header file 206. The header file 206 stores register definitions where the product design includes registers, e.g., an ASIC design. Thus, documentation tool 212 is adapted to parse the header file 206 to extract register definitions that it can copy to an output file 210. Tool path parameter 326 indicates to the documentation tool 212, a directory in which the documentation tool 212 is stored.

Once the user creates the configuration file 204, source files 214, and, if necessary, the header file 206 and object files 202 and locates them in appropriate directories, the user can run the documentation tool 212 to generate the desired output files 210. An example command line to run the documentation tool 212 is as follows:

Autodoc <Output file type><output file type><output file type>

Documentation tool 212 creates and identifies as many output file types as indicated by a user in a single run.

Referring back to FIG. 2, the documentation tool 212 includes a plurality of object files 202 defining object references, e.g., pictures, graphs, tables, other documents, web pages, web links, and the like into the output files 210. The documentation tool 212 includes the object files 202 as figures in the output files 210. The comments 216 included in the source files 214 might include references to the object files 202 by the file name. The documentation tool 212 maps the object files 202 indicated to the appropriate figure number (not shown separately) in the output files 210.

Once the documentation tool 212 extracts the comments 216 from the source files 214 responsive to the configuration file 204 and identifies object files 202, it parses the header file header file 206, if it is necessary, for register definitions (not shown separately) where the product design includes registers, e.g., an ASIC design. Where the product design includes no register definitions, no header file 206 exists.

The documentation tool 212 might include the comments 216 from the plurality of source files 214 in one, any combination, or all of the plurality of output files 210 responsive to the keywords 218 used to precede the comments 216 as explained in more detail below.

The documentation tool 212 searches through the entire source file directory (not shown) for the plurality of source files 214. Since the source files 214 might not be stored in any specific order in the source file directory, the keywords 218 preceding the comments 216 allow the user to specify a specific order for the desired comments to be included within a section of the generated output file 210 as explained in more detail below. Once the documentation tool 212 extracts the comments 216 from the source files 214, it creates a database 220 that includes the comments 216 extracted from the source files 214.

The documentation tool 212 parses the comments 216 by identifying a plurality of keywords 218. A keyword 218 precedes each comment 216 in the plurality of source files 214. Example syntax of keywords 218 is as follows.

Each output file 210 created might have a cover page, table of contents, sections, revision page, and the like (not shown). Each section, in turn, might include a section title (not shown). The section title is used to create a link from the table of contents to the corresponding section.

Section title keyword TITLE might have the following syntax:

TITLE <output file type><output file type>: <section title>: <comment>: <position relative to other section titles>

Section title keyword TITLE identifies the output files 210 that should include the particular section title noted. The user can indicate that the section title identified is to be included in as many output files 210 as desired (only two are shown in the example syntax for simplicity). The TITLE keyword can also include an integer relative position indicator that indicates to the documentation tool 212, the order of the section title in the table of contents and in the output file 210. If the TITLE keyword includes no relative position indicator, the tool 212 will order the sections alphabetically by section title. If two TITLE keywords include relative position indicators indicating the same position, the section titles will be ordered alphabetically and placed in their relative positions.

Section keyword SECTION might have the following syntax:

SECTION <output file type>_<output file type>: <section name>: <comment>: <position relative to other sections>

Section keyword SECTION operates similarly to the TITLE keyword. SECTION keyword uses the section name field to place the associated comment in the proper section of the output file 210. This allows the user to place comments anywhere that is convenient in the source file 214. Since the user can place information for a single section anywhere in the source file 214, ordering the comments within the section becomes an issue. The integer relative position indicator after the comments places groups of comments in numerical order based on its integer value. The tool 212 will append to the end of the section a comment 216 placed in a section that already exists without a relative position indicator.

Register keyword REGISTER is used in conjunction with header file 206 when registers are included in the product design. The tool 212 includes all registers in the header file 206 into an IRS output file 210($i$+1) or a HUG output file 210($i$+2) requested by the user. The tool 212 will not include registers in the header file 206 into an ERS output file 210$i$ or an EN output file 210($i$+3).

The header file 206 contains the specific address and bit field mappings. The author or designer includes the written descriptions using the keyword REGISTER. Typically, a register naming convention is adopted for use in the header file 206 allowing the register name to easily be used to identify the register and bit filed descriptions.

Register keyword REGISTER might have the following syntax:

REGISTER: section_name: register_name: descriptive-_name

The section_name identifies the document section to include in the register output document. The register_name identifies the register's name in the header file 206. The descriptive_name, as its name implies, is a descriptive name for the register.

The author or designer might use other fields in conjunction with the register keyword REGISTER to correlate comments to the bit field definitions. These fields might for example be used to identify a specific portion of a register, identify either a single bit or a series of bits within a register, and correlate data between the table and comments for a specific bit field.

The syntax of the REGISTER keyword allows the author or designer to place register documentation in specific document types excluding register definitions from other document types. Typically, the HUG and IRS contain a table of all registers contained in the product design. This table will contain links to the detailed documentation for each register.

Change log keyword CHGLOG might have the following syntax:

CHGLOG: <date of change>: <comment>

Change log keyword CHGLOG is used to keep track of significant changes made in the comments included in the source files 214. The tool 212 will include a history of all changes indicated by the keyword CHGLOG.

Heading keyword HEADING might have the following syntax:

HEADING: <heading name>

The keyword HEADING is used to insert enlarged bold text within a section. The keyword HEADING must be used after a SECTION or REGISTER keyword. Tool 212 assigns each heading a bookmark that allows the heading to act as a document link.

Objects can be inserted into output files 210 from the source files 214 using the object keyword OBJ_REF. The object keyword OBJ_REF allows the inclusion of pictures, tables, equations, and the like. The object being referenced will be inserted in the center of the page following the text before the object keyword OBJ_REF.

Each object will have a figure number inserted below the image. The size of the object is scalable using a size extension on the keyword. If no size is given, the tool 212 will insert the object without scaling. The object should be in a Hyper Text Markup Language (HTML) friendly format including JPEG, GIF, TIFF, BITMAP, and the like. The object keyword OBJ_REF might includes a caption and the tool 212 might automatically number the figures.

A person skilled in the art should recognize that that tool 212 contemplates usage of several other possible keywords including keywords allowing for intra-document links, links to external documents and/or information such as web pages via the Internet.

The documentation tool 212 generates the output files 210 indicated by the user. The output files 210 might have a plurality of formats including HTML, Portable Document Format (PDF), and the like. Where the output file 210 is in HTML format, the output file is platform independent having two levels of hierarchy to allow easy generation of hard copy documents through conversion to PDF.

The documentation tool 212 is adapted to parse any HTML constructs (not shown) embedded into the comments 216. This allows the user the freedom to embed special formatting, e.g., bulleted lists, into the comments 216 themselves rather than to format the output file 210 after its creation by the documentation tool 212.

A person skilled in the art should recognize that an embodiment of the controller 100 is a monolithic integrated circuit. It should also be readily apparent that one or more devices that include logic circuit might implement the present invention. A dedicated processor system that includes a microcontroller or a microprocessor might alternatively implement the present invention.

The invention additionally provides methods, which are described below. Moreover, the invention provides apparatus that performs or assists in performing the methods of the invention. This apparatus might be specially constructed for the required purposes or it might comprise a general-purpose computer selectively activated or reconfigured by a computer program stored in the computer. The methods and algorithms presented herein are not necessarily inherently related to any particular computer or other apparatus. In particular, various general-purpose machines might be used with programs in accordance with the teachings herein or it might prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

A program is generally defined as a sequence of processes leading to a desired result. These processes, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they might be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming might use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there might be cases where modules are equivalently aggregated into a single program with unclear boundaries. In any event, the software modules or features of the present invention might be implemented by themselves, or in combination with others. Even though it is said that the program might be stored in a computer-readable medium, it should be clear to a person skilled in the art that it need not be a single memory, or even a single machine. Various portions, modules or features of it might reside in separate memories or separate machines where the memories or machines reside in the same or different geographic location. Where the memories or machines are in different geographic locations, they might be connected directly or through a network such as a local access network (LAN) or a global computer network like the Internet®.

In the present case, methods of the invention are implemented by machine operations. In other words, embodiments of the program of the invention are made such that they perform methods of the invention that are described in this document. These might be optionally performed in conjunction with one or more human operators performing some, but not all of them. As per the above, the users need not be collocated with each other, but each only with a machine that houses a portion of the program. Alternately, some of these machines might operate automatically, without users and/or independently from each other.

Methods of the invention are now described. A person having ordinary skill in the art should recognize that the boxes described below might be implemented in different combinations, and in different order. Some methods might be used for determining a location of an object, some to determine an identity of an object, and some both.

Figure 4A:
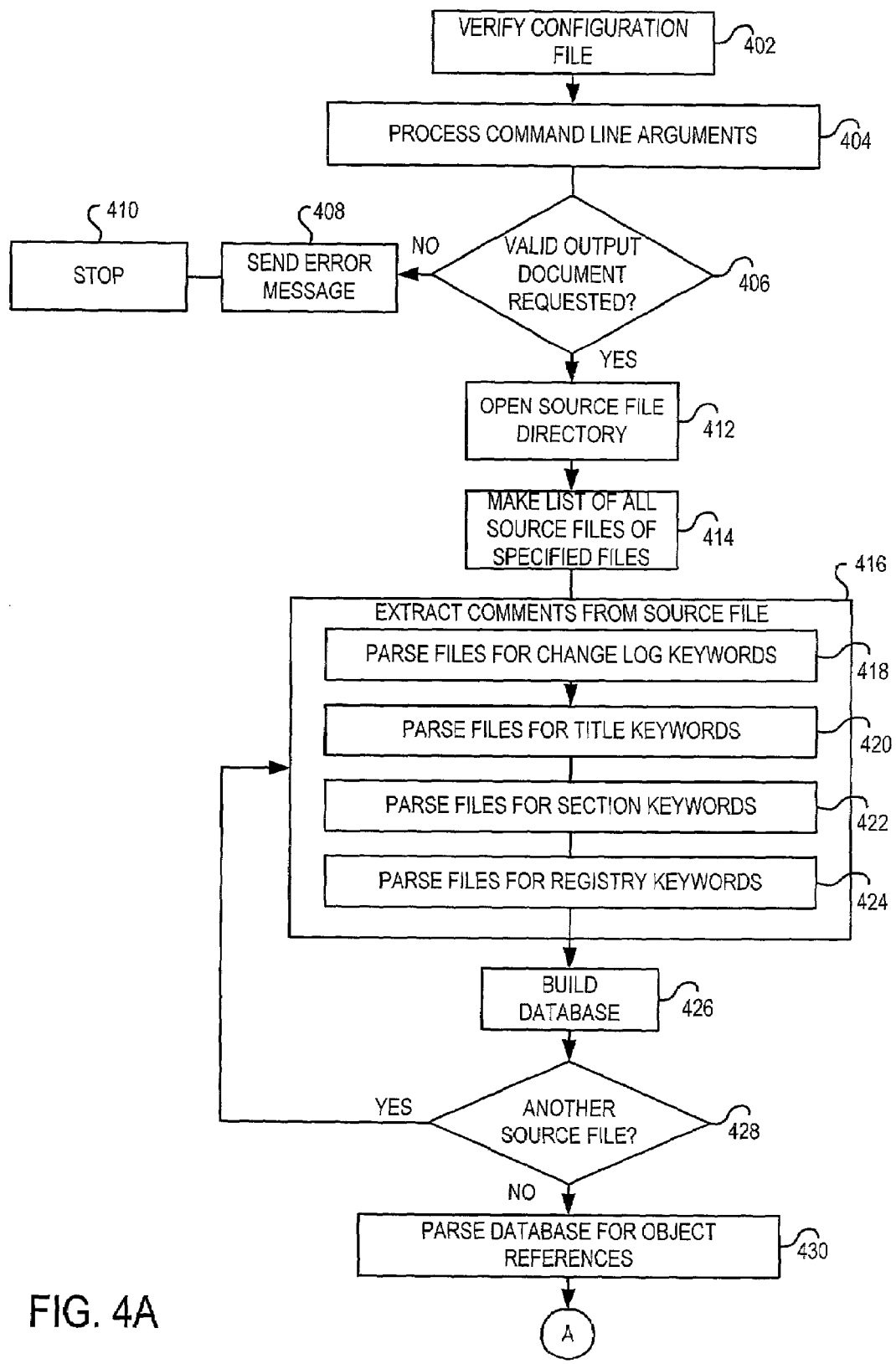
FIGS. 4A and 4B are flowcharts of a method for automatically generating documentation according to the present invention.
Figure 4B:
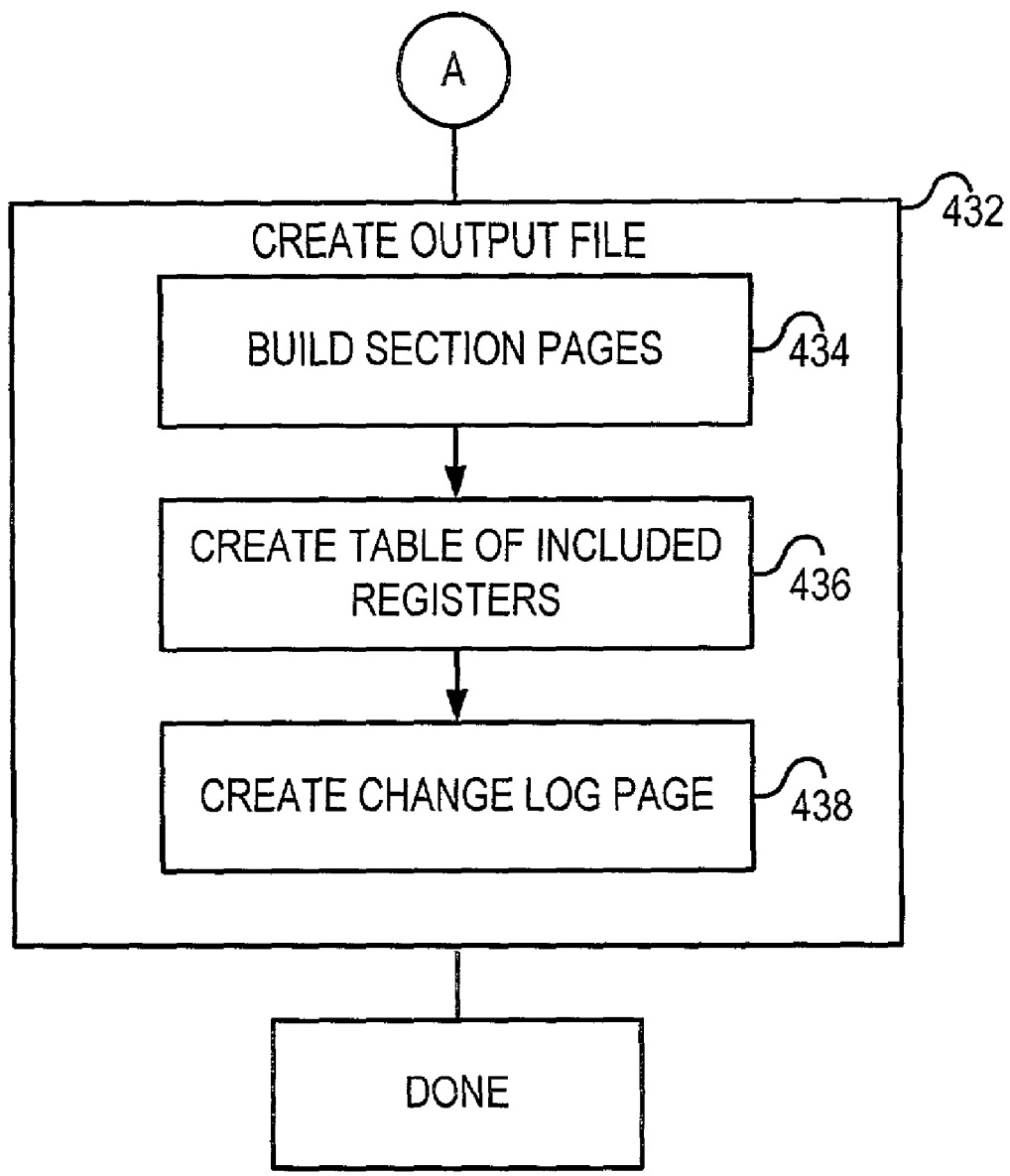

FIG. 4 is a flowchart of the method 400 for automatically generating documentation according to the present invention. At 402, the documentation tool verifies the contents and existence of a configuration file. At 404, the documentation tool processes and verifies the command line arguments. At 406, the tool determines whether the user requested a valid output file in the command line arguments. If a valid output file is not requested, the tool issues an error message at 408 followed by stopping processing at 410. If a valid output file is requested, the tool opens the source file directory (412). At 414, the tool makes a list of all source files of each specific type included in the configuration file. At 416, the tool extracts the comments from the first source file by parsing the source file for change log keywords (418), title keywords (420), section keywords (422), and register keywords (424). At 426, the tool builds a database with the comments extracted at 416. If another source file is to be processed (428), the tool returns to extract the comments from the next source file at 416. When no other source file is to be processed (428), the tool parses the database 426 for object references (430). At 432, the tool creates the output files requested by the user by building section pages (434), creating a table of included registers where necessary (436), and creating a change log page (438).

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for automatically generating documentation for a design, comprising:

embedding comments into at least two source files having distinct types, each source file defining an aspect of the design;

creating a configuration file including parameters associated with each type of source file; and extracting the comments from each source file responsive to the parameters associated with each type of source file to create the documentation;

wherein extracting comments includes parsing each source file for keywords;

wherein parsing each source file for keywords comprises:
parsing each source file for a change log keyword;

parsing each source file for a title keyword;
parsing each source file for a section keyword; and
parsing each source file for a register keyword.

2. The method of claim 1 comprising creating a first source file using a source software different than that used to create remaining source files.

3. The method of claim 1 wherein creating a configuration file includes verifying a valid output file.

4. The method of claim 1 comprising:
extracting source file directory information from one of the parameters included in the configuration file; and
opening the source file directory.

5. The method of claim 1 comprising building a database with the comments extracted from each source file.

6. The method of claim 1 comprising parsing the comments extracted from each source file for object references.

7. The method of claim 1 comprising parsing the comments extracted from each source file for headings.

8. A method for automatically generating documentation for a design, comprising:
embedding comments into a plurality of source files defining the design;
creating a configuration file including parameters associated with each source file;
extracting the comments from each source file responsive to the parameters; and
building an output document from the comments extracted from each source file, the output document being any one of an IRS, ERS, HUG, EN, and VP document;
where building an output document includes:
building section pages;
creating a table of included registers; and
creating a change log page.

9. The method of claim 8 wherein building an output document includes automatically keeping track of document revisions.

10. The method of claim 8 wherein building an output document includes automatically tracking hyper links and comment character definitions.

* * * * *

UNITED STATES PATENT AND TRADEMARK OFFICE
CERTIFICATE OF CORRECTION

| | | |
|---|---|---|
| PATENT NO. | : 7,155,664 B1 | Page 1 of 1 |
| APPLICATION NO. | : 10/061906 | |
| DATED | : December 26, 2006 | |
| INVENTOR(S) | : R. Samual Lee and Calvin K. McDonald | |

It is certified that error appears in the above-identified patent and that said Letters Patent is hereby corrected as shown below:

On Title page

Page 1, item (63) Related U.S. Applications please add: --Claims priority from and is a continuation of U.S. patent application No. 10/003,618 filed Nov. 14, 2001, now abandoned, which claims priority from U.S. provisional patent application No. 60/248,946 filed Nov. 14, 2000.--

Signed and Sealed this

Third Day of April, 2007

JON W. DUDAS
*Director of the United States Patent and Trademark Office*